INVENTORS:
HENRY A. SALLER
JOHN R. KEELER
EDWIN R. SZUMACHOWSKI
BY Roland A. Anderson
ATTORNEY

2,813,073
NEUTRON REACTOR FUEL ELEMENT UTILIZING ZIRCONIUM-BASE ALLOYS

Henry A. Saller, Columbus, John R. Keeler, Grandview Heights, and Edwin R. Szumachowski, Columbus, Ohio, assignors to the United States of America as represented by the United States Atomic Energy Commission Application January 4, 1952, Serial No. 265,018

2 Claims. (Cl. 204—193.2)

This invention deals with uranium bodies for neutronic reactors, and in particular with coatings or casings for such bodies.

It is an object of this invention to provide uranium-containing bodies which have a high corrosion resistance.

It is also an object of this invention to provide a corrosion-resistant layer on uranium bodies without introducing an element that would bring about in the bodies an increase of the neutron-capture cross-section.

It is finally another object of this invention to provide a coating for uranium bodies which has great hardness and mechanical strength and thus is very durable.

These and other objects are accomplished by jacketing or coating the uranium bodies with an alloy of zirconium and tin in amounts ranging between 1% and 15%; optimal values have been obtained with a tin content of approximately 5%.

Zirconium metal occurs in two phases, the $\alpha$ phase and the $\beta$ phase. The transition temperature for pure zirconium is at 862° C., while for a zirconium-tin alloy containing 10% tin transformation from $\alpha$ to $\beta$ phase takes place at 1010° C. The solubility of tin in $\alpha$-phase zirconium was found to be less than 1% at room temperature and about 9% at 1010° C.

There are various sources for zirconium metal, which means different processes are available for the production of the zirconium metal. A process used by the U. S. Bureau of Mines is described for instance in Industrial and Engineering Chemistry 42, 395 (1950); this type of zirconium is usually referred to as "sponge zirconium." The so-called "crystal bar zirconium" is made by a process patented to Van Arkel and De Boer in U. S. Patent 1,671,213. A third type of zirconium is made in a bomb by the reduction of zirconium tetrafluoride with calcium in the presence of a booster; this process is described and claimed in the assignee's copending application Serial No. 277,899, filed March 28, 1952, by Spedding, Wilhelm and Keller, granted on February 5, 1957, as Patent No. 2,780,514. The zirconium derived from this process will be referred to hereinafter as "bomb zirconium."

The zirconium-tin alloys are preferably prepared by first producing, as a master alloy, the eutectic which contains 21% tin. This is preferably done by melting the metals in a graphite crucible using induction heating; the carbon pick-up in this instance usually ranges from about 500 to 700 p. p. m. of alloy, while with other methods described below, the carbon content ranges between 1000 and 1500 p. p. m. The master alloy is then melted, also using induction heating, with additional zirconium, the quantity of which, of course, depends on the final content desired; a homogeneous alloy was always obtained.

Instead of induction-melting the master alloy and the zirconium, sponge zirconium, for instance, and mossy tin, may also be alloyed in a direct-current arc-melting furnace. Another process of producing the alloy is by using the bomb reduction process and adding, prior to reaction, the necessary quantity of tin to the reaction mixture whereby a zirconium-tin alloy is obtained.

The corrosion resistance of the various alloys produced was tested in most cases by immersing a sample for a certain period of time in water of 315° C. contained in an autoclave under conditions that produce a pressure of 1500 p. s. i. An immersion time of about one hundred hours yielded results reliable enough to permit conclusions with regard to corrosion resistance. A more rapid test has also been developed and successfully used in which, instead of water, steam of about 400° C. and also 1500 p. s. i. was allowed to react on the samples in the autoclave. In the latter type of test, considerably less time was required for obtaining the same degree of corrosion as in the water immersion test.

In the following a number of examples are given which demonstrate the increase of corrosion resistance obtained by incorporating tin into zirconium, a feature of prime importance for fuel elements for neutronic reactors. These examples are for illustrative purposes only and not intended to limit the scope of the invention to the details given therein.

EXAMPLE I

A sample of one type of zirconium metal was found to corrode, when immersed in water of 315° C. and 1500 p. s. i., at a rate of about 30 mg./cm.$^2$/mo. weight increase and fell to pieces after a little more than one hundred hours. Another sample of an alloy containing 95% of the same type of zirconium metal and 5% of tin showed, under the same conditions, a weight increase of only 1 mg./cm.$^2$/mo. and still was in good condition after having been subjected to the water test for several hundred hours.

EXAMPLE II

Various types of zirconium metal were alloyed with various proportions of tin, and hardness and corrosion resistance were determined of some of the alloys. The results are compiled in the following table.

*Table I*

| Tin, Percent | Melting Data | | Hardness Rockwell A | Corrosion Data | |
|---|---|---|---|---|---|
| | Type of Zirconium | Melted in— | | Length of Test, hrs. | Rate of Wt. Gain mg./cm.$^2$/mo. |
| 0 | Crystal bar Zr. | Graphite crucible. | 44 | 238 | 7–10 |
| 2.95 | ----do------ | ----do------ | 53 | 238 | 0.4–0.6 |
| 0 | Sponge zirconium. | ----do------ | 45 | 130 | 6 |
| 1.65 | ----do------ | ----do------ | 49 | 130 | 0.3 |
| 4.6 | ----do------ | Tungsten arc. | 58 | | |
| 8.5 | ----do------ | ----do------ | 61 | | |
| 0 | Bomb zirconium. | Graphite crucible. | | ~100 | ~30 |
| 2 | ----do------ | ----do------ | | 400 | 0.8–1 |
| 5 | ----do------ | ----do------ | | 400 | 1–2 |

These examples show that in all three types of zirconium used, the corrosion resistance improved and that the hardness also increased in the samples tested with increasing tin content.

EXAMPLE III

Arc-melted crystal bar zirconium containing 8000 p. p. m. of titanium, which was known to have poor corrosion resistance, was used in this set of experiments. The zirconium was alloyed with various amounts of tin, and the corrosion resistance was then determined by the water immersion test. The results are given below,

Table II

| Nominal Tin, Percent | Weight Gain, mg./cm.² | |
|---|---|---|
| | 43 hrs. | 1,300 hrs. |
| 0 | 4.3 | |
| 1 | 2.5 | |
| 5 | 0.5 | [1] 0.18 |
| 10 | 1.53 | 62.4 |

[1] Possibly small loss by flaking.

EXAMPLE IV

Arc-melted sponge zirconium was used in this example; the test conditions were identical with those used in Example III.

Table III

| Nominal Tin, Percent | Weight Gain, mg./cm.², 782 hrs. |
|---|---|
| 0 | 2.72 |
| 1 | 1.86 |
| 5 | 0.21 |
| 10 | 0.17 |

EXAMPLE V

A zirconium melted by induction heating in a graphite crucible and having poor corrosion resistance formed the basis for the alloys used in this example. The zirconium was contaminated by 3300 p. p. m. of carbon, 200 p. p. m. of nitrogen, 50 p. p. m. of titanium, 8000 p. p. m of hafnium, about 1300 p. p. m. of iron and about 300 p. p. m. of aluminum. Corrosion testing again was carried out by immersion in water of 315° C. The results are compiled in Table IV.

Table IV

| Nominal Tin, Percent | Weight Gain, mg./cm.² | |
|---|---|---|
| | 300 hrs. | 810 hrs. |
| 0 | 29.4 | |
| 6.2 | 0.07 | [1] 0.00 |
| 8.9 | 0.07 | 0.05 |
| 10.8 | 0.11 | 0.35 |

[1] Possibly small loss by flaking.

EXAMPLE VI

In this experiment both tests, namely, immersion in water and exposure to steam of 400° C., as described above, were used. In this case zirconium plate was used that had been obtained by arc-melting chips of sponge zirconium using a sponge zirconium electrode and rolling the ingot obtained into a plate. Tin was incorporated by induction melting. The results are compiled in the table below, the figures indicating weight increases in mg./cm.²

These tests show that including the samples containing 10.80% tin the corrosion resistance was considerably improved over that of pure zirconium; a tin content of 24.60% was too high and impaired the corrosion resistance remarkably. It was found that zirconium-tin alloys having a tin content up to 15% are suitable for coatings or casings of uranium bodies.

The zirconium-tin coatings may be applied to the bodies by any method known to those skilled in the art. For instance, the coatings may be obtained by immersing the bodies in the molten alloy. A jacket may also be separately prepared from the zirconium-tin alloy and then applied and bonded to the bodies.

In the accompanying drawings there is illustrated, by way of example, one embodiment of the fuel element of this invention. In these drawings, Figure 1 is a plan view of the fuel element;

Figure 1:
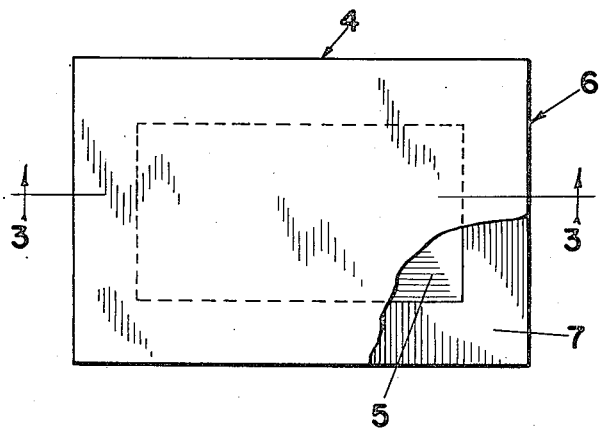
Figure 2:
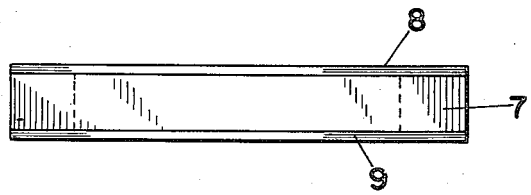
Figure 2 is an elevational view of the fuel element.
Figure 3:
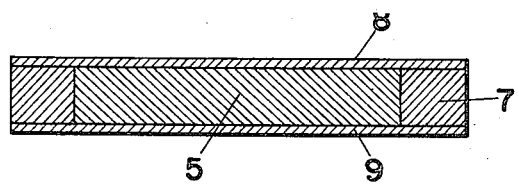
Figure 3 is a vertical sectional view of the same fuel element taken along the line 3—3 of Figure 1.

Referring to the drawings in detail, 4 indicates the fuel element in general, which consists of a core 5 and of a jacket designated by reference numeral 6. The core 5 comprises the fissionable material and consists of an alloy of zirconium and $U^{235}$-enriched uranium; it is encased in a rectangular block 7 made of the zirconium-tin alloy according to this inventon, and in two cover plates 8 and 9 also consisting of the same alloy. Elements 7, 8 and 9 form the jacket 6. The entire assembly has been subjected to rolling whereby bonding of the various elements has been obtained.

More details on the fuel elements of this embodiment and their manufacture can be found in copending application Serial No. 323,348 filed on December 1, 1952 by Henry A. Saller.

The coated uranium bodies of this invention are useful in neutronic reactors of the type described in the copending application of Fermi et al., Serial No. 568,904, filed December 19, 1944, granted on May 17, 1955, as Patent No. 2,708,656.

It will be understood that this invention is not to be limited to the details given herein but that it may be modified within the scope of the appended claims.

We claim:

1. A fuel element for neutronic reactors having a high corrosion resistance to water, consisting of a core consisting of an alloy of zirconium and $U^{235}$-enriched uranium and a jacket all around and bonded to said core, said jacket consisting of a binary zirconium-tin alloy in which the tin content ranges between 1 and 15% by weight.

2. The fuel element of of claim 1 wherein the tin content is about 5%.

References Cited in the file of this patent
UNITED STATES PATENTS
1,562,540   Cooper _____ Nov. 24, 1925

OTHER REFERENCES
Armour Research Foundation, "Phase Diagrams of Zir-

Table V

| | 315° C. Water (1,500 p. s. i.) | | | | | | | | | 400° C. Steam (1,500 p. s. i.) | | |
|---|---|---|---|---|---|---|---|---|---|---|---|---|
| | Exposure Time, Hours | | | | | | | | | Exposure Time, Hours | | |
| Percent SN | 43 | 80 | 146 | 200 | 300 | 500 | 810 | 1,260 | 1,620 | 54 | 72 | 90 |
| <0.05 | 1.64 | 3.80 | 9.30 | 17.80 | 29.40 | | | | | 0.57 | 1.37 | 1.47 |
| 6.20 | 0.01 | 0.02 | 0.04 | 0.05 | 0.05 | 0.07 | 0.10 | 0.17 | 0.18 | 0.49 | 0.41 | 0.47 |
| 8.94 | 0.02 | 0.06 | 0.07 | 0.11 | 0.11 | 0.16 | 0.22 | 0.29 | 0.38 | 0.46 | 0.47 | 0.59 |
| 10.80 | 0.03 | 0.07 | 0.10 | 0.10 | 0.11 | 0.23 | 0.35 | 0.55 | 0.72 | 0.61 | 0.82 | 1.06 |
| 24.60 | 3.93 | 9.67 | 22.00 | 34.70 | 65.0 | | | | | | | | conium-Base Binary Alloys," 25 pages, dated March 3, 1951, U. S. AEC Doc. No. AECU–1223, pp. 1–10 especially relied upon.

Bureau of Mines Report of Investigations 4658, "A Preliminary Survey of Zirconium Alloys," by C. T. Anderson et al., March 1950, pp. 2–6, 42 and 43.

H. D. Smyth: "A General Account of the Development of Methods of Using Atomic Energy for Military Purposes," published August 1945, pp. 102–107.

Chipman: "Metallurgy in the Development of Atomic Power," U. S. AEC Doc. No. MDDC–539 20 pages dated October 1946, declass. November 25, 1946, pp. 15, 16 especially relied upon.

Boulger: "The Properties of Zirconium," U. S. AEC Doc. No. AECD–2726, 83 pages, dated March 15, 1949, declass. October 18, 1949, pages 2 and 4 especially relied upon.